United States Patent
Cordeiro

(10) Patent No.: US 9,204,489 B2
(45) Date of Patent: Dec. 1, 2015

(54) METHOD, APPARATUS AND SYSTEM OF COMMUNICATION OVER MULTIPLE FREQUENCY BANDS

(75) Inventor: Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 13/982,265

(22) PCT Filed: Oct. 28, 2011

(86) PCT No.: PCT/US2011/058439
§ 371 (c)(1),
(2), (4) Date: Jul. 28, 2013

(87) PCT Pub. No.: WO2012/106018
PCT Pub. Date: Aug. 9, 2012

(65) Prior Publication Data
US 2013/0308543 A1    Nov. 21, 2013

Related U.S. Application Data

(60) Provisional application No. 61/438,815, filed on Feb. 2, 2011.

(51) Int. Cl.
*H04Q 7/00* (2006.01)
*H04W 88/06* (2009.01)
*H04W 12/04* (2009.01)

(52) U.S. Cl.
CPC .............. *H04W 88/06* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 8,254,296 B1 * | 8/2012 | Lambert et al. | 370/295 |
| 2009/0168650 A1 | 7/2009 | Kesselman | |
| 2010/0332822 A1 | 12/2010 | Liu et al. | |

FOREIGN PATENT DOCUMENTS

| | | |
|---|---|---|
| JP | 2004229087 | 8/2004 |
| JP | 2012531817 | 12/2012 |
| KR | 20070029927 | 3/2007 |
| WO | 2009085527 | 7/2009 |
| WO | 2011005567 | 1/2011 |

OTHER PUBLICATIONS

Office Action for Japanese Patent Application No. 2012-002109, mailed Nov. 14, 2013, 4 pages, including 2 pages of English translation.
"PHY/MAC Complete Proposal Specification", IEEE802.11-10/0433r1, May 17, 2010, 254 pages.
Office Action for for Chinese Patent Application No. 201210028530.8, mailed on Mar. 3, 2014, 23 pages, including 13 pages of English translation.

(Continued)

*Primary Examiner* — Duc C Ho
(74) *Attorney, Agent, or Firm* — Shichrur & Co.

(57) ABSTRACT

Devices, systems and methods of communication over multiple wireless communication frequency bands. For example, a multiple frequency band (multi-band) wireless communication device may include at least two radios to communicate over at least two different frequency bands; and a common station management entity (SME) operably coupled to the at least two radios, and configured to manage parallel and simultaneous operation of the at least two radios.

33 Claims, 3 Drawing Sheets

(56) References Cited

OTHER PUBLICATIONS

Office Action for for Chinese Patent Application No. 201210028530.8, mailed on Dec. 15, 2014, 22 pages, including 13 pages of English translation.

Darwin, "MAC Component Breakdown Topics for Discussion", doc.: IEEE802.11-08/08670, Jul. 15, 2008, 34 pages.

Office Action for Japanese Patent Application No. 2012-002109, mailed on Apr. 23, 2013, 4 pages, including 2 pages of English translation.

International Preliminary Report on Patentability and Written Opinion for PCT patent Application No. PCT/US2011/058439, mailed on Aug. 15, 2013, 7 pages.

International Search Report and Written Opinion for PCT Application No. PCT/US2011/058439, mailed on May 17, 2012, 10 pages.

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

Wireless Gigabit Alliance (WGA) Specifications; WiGig MAC and PHY Specification Version 1.0, Apr. 2010—Final Specification; 311 pages.

Cariou, "Fast Session Transfer", doc.: IEEE 802.11-10/491r2, Apr. 30, 2010, 19 pages.

Cordeiro, "PHY/MAC Complete Proposal to TGad", doc.: IEEE 802.11-10/0432r2, 20 pages.

Office Action of Chinese Patent Application No. 201210028530.8, mailed Sep. 8, 2015, 12 pages (including 7 pages of English translation).

* cited by examiner

METHOD, APPARATUS AND SYSTEM OF COMMUNICATION OVER MULTIPLE FREQUENCY BANDS

CROSS REFERENCE

This application is a National Phase Application of PCT International Application No. PCT/US2011/058439, International Filing Date Oct. 28, 2011, which in turn claims the benefit of and priority from U.S. Provisional Patent application No. 61/438,815, filed Feb. 2, 2011, the entire disclosures of which are incorporated herein by reference.

BACKGROUND

A number of wireless devices today claim to be multiband. This term is commonly used to refer to devices that support operation in multiple frequency bands, such as 2.4 GHz, 5 GHz, cellular bands, and the like.

Although these devices are multi-band from a frequency band point of view, from a radio implementation and system integration perspective the operation across the supported frequency bands are completely independent.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
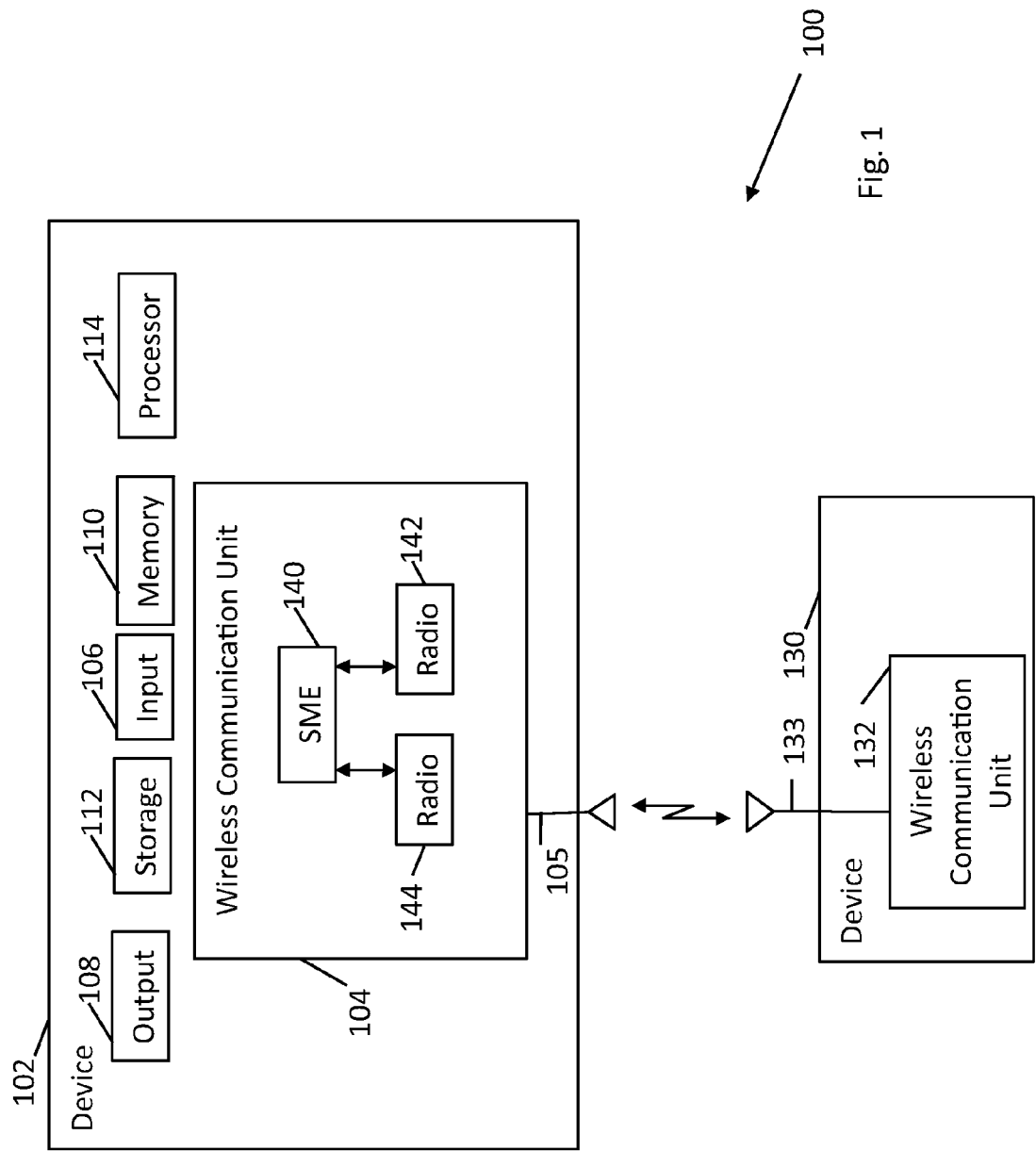
FIG. 1 is a schematic illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2007, *IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications; IEEE* 802.11*n*-2009, *IEEE Standard for Information Technology—Telecommunications and information exchange between Systems—Local and metropolitan area networks—Specific requirements, Part* 11: *Wireless LAN Medium Access Control (MAC) and Physical Layer (PHY) specifications, Amendment* 5: *Enhancements for Higher Throughput; IEEE*802.11 task group ac (TGac) ("*IEEE*802.11-09/0308*r*12—*TGac Channel Model Addendum Document*"), *IEEE* 802.11 *task group ad (TGad)*) (*IEEE P*802.11*ad/D*1.0 *Draft Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 5: *Enhancements for Very High Throughput in the* 60 *GHz Band*), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e,* 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The phrase "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 Gigahertz (GHz), a frequency band of 2.4 GHz and/or a frequency band of 5 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHz, a WLAN frequency band, a frequency band according to the IEEE 802.11 specifications, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include an antenna covered by a quasi-omni antenna pattern. For example, the antenna may include at least one of a phased array antenna, a single element antenna, a set of switched beam antennas, and the like.

The phrase "quasi-omni antenna pattern", as used herein, may include an operating mode with a widest practical beamwidth attainable for a particular antenna.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "association", as used herein may relate to a service used to establish access point/station (AP/STA) mapping and enable STA invocation of distribution system services (DSSs).

The term "authentication", as used herein may relate to a service used to establish the identity of one station (STA) as a member of the set of STAs authorized to associate with another STA.

The term "beamforming", as used herein, may relate to a spatial filtering mechanism, which may be used at a transmitter to improve the received signal power or signal-to-noise ratio (SNR) at an intended receiver.

The phrase "non-access-point (non-AP) station (STA)", as used herein, may relate to a STA that is not contained within an AP.

The phrase "service period" (SP), as used herein, may relate to a contiguous time during which one or more downlink individually addressed frames are transmitted to a quality of service (QoS) station (STA) and/or one or more transmission opportunities (TXOPs) are granted to the same STA.

The phrase "directional band" (DBand), as used herein, may relate to a frequency band wherein the Channel starting frequency is above 45 GHz.

The phrase "DBand STA", as used herein, may relate to a STA whose radio transmitter is operating on a channel that is within the DBand.

The phrase "omni-directional band" (OBand), as used herein, may relate to a frequency band having a channel starting frequency below 6 GHz. For example, the OBand may include a 2.4 GHz band, a 5 GHz band, and the like.

The phrase "OBand STA", as used herein, may relate to a STA whose radio transmitter is operating on a channel that is within the OBand.

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrases "PCP/AP" and "wireless network controller", as used herein, may relate to a STA that is a PCP or an AP.

The terms "traffic" and/or "traffic stream(s)", as used herein, may relate to a data flow and/or stream between wireless devices such as STAs.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, an OBand channel, a DBand channel, and the like. One or more elements of system 100 may optionally be capable of communicating over any suitable wired communication links. For example, system 100 may operate according to standards developed by the *IEEE* 802.11 *task group ad* (*TGad*), according to the WGA specifications, according to IEEE 802.15.3c standard, according to the WirelessHD™ specification, according to the ECMA-387 standard, and/or according to another suitable wireless standard.

In some demonstrative embodiments, wireless communication devices 102 and/or 130 may include, for example a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

In some demonstrative embodiments, devices 102 and/or 130 may include and/or perform the functionality of a multiple frequency band (multi-band) device capable of communicating over a plurality of wireless communication frequency bands, e.g., as described in detail below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include an antenna covered by a quasi-omni antenna pattern. For example, antennas 105 and/or 133 may include at least one of a phased array antenna, a single element antenna, a set of switched beam antennas, and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish at least one wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and/or 130 may perform the functionality of DBand STAs and/or OBand STAs, e.g., as described below.

In some demonstrative embodiments, device 102 may perform the functionality of a multi-band device capable of communicating, e.g., with device 130 and/or one or more other devices, over multiple wireless communication frequency bands, as described in detail below.

In some demonstrative embodiments, devices 102 and/or 104 may utilize a multi-band operation mechanism, which is configured to allow integration and/or seamless operation across different frequency bands and/or channels. The multi-band mechanism (also referred to as "fast session transfer" (FST)) may significantly improve user experience, for example, by offering real-time integration at the data link level between radios of different technologies, e.g., WGA-based and IEEE 802.11-based technologies.

In some demonstrative embodiments, devices 102 and/or 104 may be configured to provide effective sharing and/or exchange of information between different data link layer technologies, and/or to offer a mechanism whose operation is completely transparent to higher layer (e.g., network) protocols, such as, for example, Internet Protocol (IP).

In some demonstrative embodiments, wireless communication unit 104 may include at least two radios, e.g., including radios 142 and 144, to communicate over at least two different frequency bands.

In one embodiment, radio 142 may communicate over the DBand and/or radio 144 may communicate over the OBand. For example, radio 142 may perform the functionality of at least one DBand STA, e.g., by communicating over a 60 GHz frequency band; and/or radio 144 may perform the functionality of at least one OBand STA, e.g., by communicating over a 2.4 GHz or 5 GHz frequency band.

In some demonstrative embodiments, the at least two radios may include three or more radios, for example, at least a first OBand radio to communicate over a first OBand, a second OBand radio to communicate over a second, different, OBand, and a third radio to communicate over a DBand, e.g., as described below with reference to FIG. 2. In other embodiments, the at least two radios may include any other combination of two or more radios operating at two or more frequency bands.

In some demonstrative embodiments, wireless communication unit 104 may include a common Station-Management-Entity (SME) 140, operably coupled to radios 142 and 144. SME 140 may be configured to manage parallel and simultaneous operation of radios 142 and 144, e.g., as described in detail below.

In some demonstrative embodiments, wireless communication unit 104 may include a single SME, e.g., SME 140, commonly managing radios 142 and 144, as opposed, for example, to existing implementations claiming to be "multi-band", in which a plurality of SMEs are used, such that each SME is used, e.g., independently, for each frequency band.

Alternatively, functions of SME 140 may be duplicated to operate independently over each MAC/PHY stack. However, a single multi-band management entity may exist that spans over all MAC/PHY stacks and that controls the multi-band operation.

In some demonstrative embodiments, SME 140 may manage the association, disassociation, connection management, traffic stream establishment, security key management, and the like, e.g., for each individual MAC/PHY stack available in device 102. For example, SME 140 may be configured to manage at least association, disassociation and traffic stream establishment for each of the at least two radios 142 and 144. The common management of these operations may enable, for example, a seamless and/or integrated operation, e.g., across all bands supported by device 102.

Although the scope of the present invention is not limited to this exemplary embodiment of the invention, SME 140 may manage the operation over more than one frequency band/channel. For example, SME 140 may manage the setting up, configuring and tearing down the real-time transfer of traffic sessions amongst the different frequency bands supported by device 102. In one example, SME 140 may be configured to coordinate setup, tear down and/or fast session transfer from one frequency band, e.g., from the frequency band supported by radio 142, to another frequency band, e.g., to the frequency band supported by radio 144.

In some exemplary embodiments of the invention, the operation across the different frequency bands supported by device 102 may be simultaneous. In other embodiments, the operation across the different frequency bands supported by device 102 may be non-simultaneous.

For example, SME 140 may include one or more security management key entities, e.g., N≥1 management keys, for radios 142 and 144.

Each of the one or more security management key entities may include a Robust Security Network Association (RSNA) key. For example, SME 140 may include at least one first RSNA key for radio 142 and at least one second RSNA key for radio 144.

In some demonstrative embodiments, the one or more security management key entities may include at least one common security management key entity shared between two or more of the at least two radios. For example, SME 140 may include a key management entity shared between radios 142 and 144, e.g., if transparent FST is to be used.

In some demonstrative embodiments, radios 142 and 144 may include at least first and second Media-Access-Control (MAC) Service Access Point (SAPs) each identified by a MAC address, e.g., in analogy to the description below with reference to FIG. 2. For example, each MAC SAP of radios 142 and 144 may be identified by a unique MAC address.

In other embodiments, a pair of MAC SAPs of radios 142 and 144 may be identified by non-unique. For example, a pair of MAC SAPs of radios 142 and 144 may share a common MAC address, e.g., if transparent FST is to be used.

Figure 2:
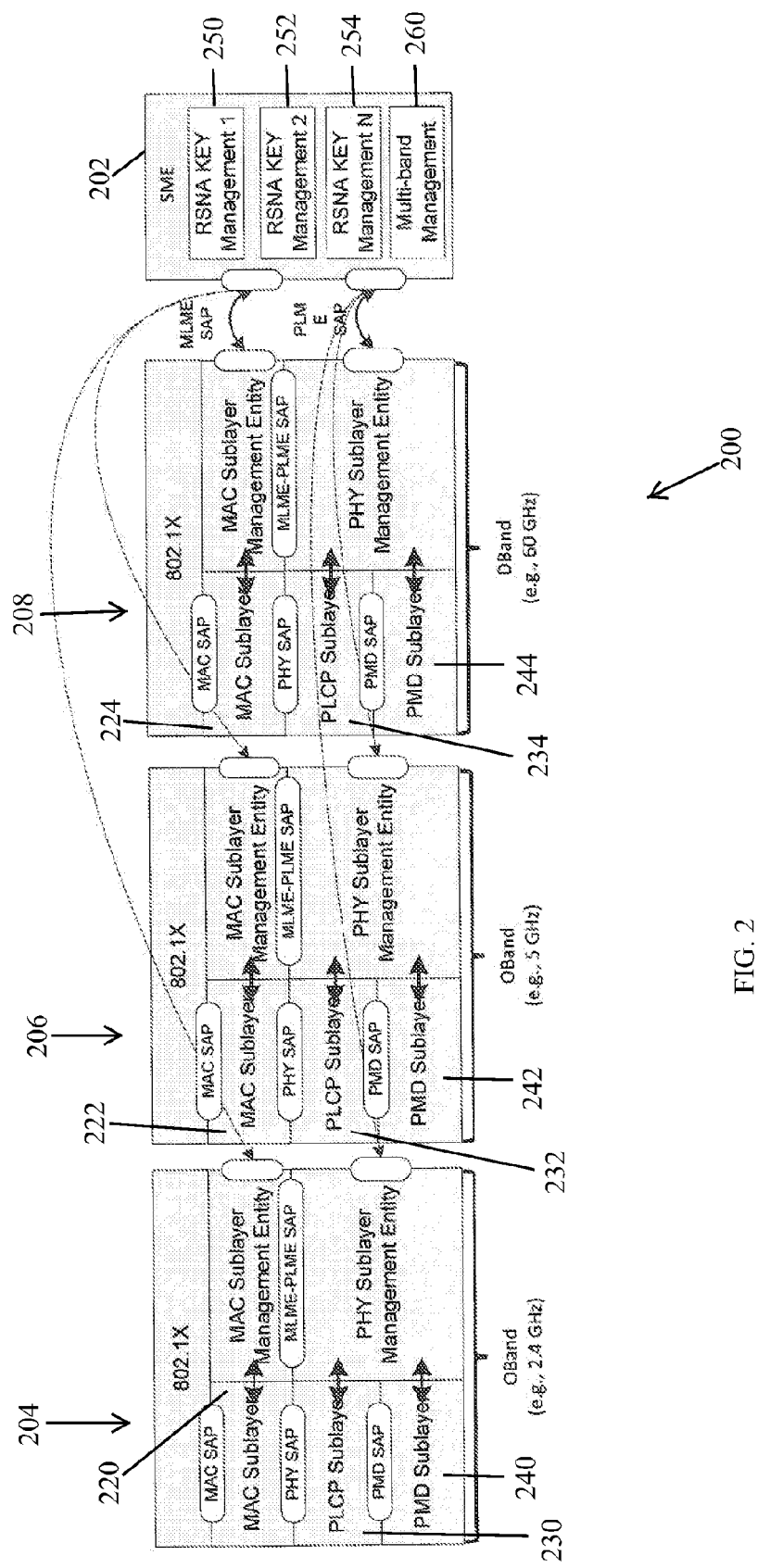
FIG. 2 is a schematic illustration of a device including a Station-Management-Entity (SME) coupled to a plurality of radios, in accordance with some demonstrative embodiments.

Reference is made to FIG. 2, which schematically illustrates a device 200 including a SME 202 coupled to a plurality of radios, e.g., including three radios 206, 206 and 208, in accordance with some demonstrative embodiments.

Although the scope of the present invention is not limited in this respect, radio 204 may operate at a first frequency band, radio 206 may operate at a second frequency band, and radio 208 may operate at a third frequency band.

For example, the first, second and third frequency bands may include different frequency bands, wherein radio 204 may operate over a first OBand frequency, radio 206 may operate over a second OBand frequency, and/or radio 208 may operate over a DBand frequency. For example, radio 204 may operate at a 2.4 GHz frequency band, radio 206 may operate at a 5 GHz frequency band, and/or radio 208 may operate at a 60 GHz frequency band.

In some demonstrative embodiments, SME 202 may manage the association, disassociation, connection management, traffic stream establishment, security key management, and the like, for each of radios 204, 206 and 208. The common management of these operations may enable, for example, a seamless and/or integrated operation, e.g., across the first, second and third frequency bands.

For example, SME 202 may manage the setting up, configuring and tearing down the real-time transfer of traffic sessions amongst the first, second and third frequency bands.

In some demonstrative embodiments, SME 202 may include a multi-band management module (also referred to as "multi-band management entity") 260 configured to manage parallel and simultaneous operation of at least two radios of radios 204, 206 and 208. For example, module 260 may be configured to coordinate the setup, configuration, tear down and/or transfer of FST sessions from a first band/channel to a second band/channel supported by radios 204, 206 and 208.

In some demonstrative embodiments, device 200 may include a plurality of MAC entities. In some embodiments, e.g., as shown in FIG. 2, each of radios 204, 206 and 208 may include a single MAC entity. In other embodiments, one or more of radios 204, 206 and 208 may include more than one MAC entity.

In some embodiments, e.g., as shown in FIG. 2, radio 204 may include a MAC sub-layer 220 associated with a Physical (PHY) layer, e.g., including a Physical Layer Convergence Protocol (PLCP) sub-layer 230 and a Physical Medium Dependent (PMD) sub-layer 240. Radio 206 may include, for example, a MAC sub-layer 222 associated with a PHY layer, e.g., including a PLCP sub-layer 232 and a PMD sub-layer 242. Radio 208 may include, for example, a MAC sub-layer 224 associated with a PHY layer, e.g., including a PLCP sub-layer 234 and a PMD sub-layer 244. Radios 204, 206 and/or 208 may also include a MAC sub-layer management entity (MLME) and/or a PHY sub-layer management entity (PLME).

In some demonstrative embodiments, as shown in FIG. 2, each of the MAC entities of radios 204, 206 and 208 may include a separate PLCP sublayer and/or a separate PMD sublayer.

In other embodiments, one or more of the MAC entities may share a common PLCP sublayer and/or a common PMD sublayer. For example, although FIG. 2 shows a one-to-one mapping between each PHY and MAC layer, in some embodiments multiple MAC addresses may be supported, such that, for example, multiple MAC layers may share the same PHY layer, with each MAC layer having its own MAC address.

In some embodiments of the invention, MAC sub-layer 220 may be identified by a first MAC address, MAC sub-layer 222 may be identified by a second MAC address, and MAC sub-layer 224 may be identified by a third MAC address.

In some demonstrative embodiments, SME 202 may coordinate the management of multiple MAC entities having MAC sub-layers, e.g., MAC sub-layers 220, 222 and 224. For example, each of MAC sub-layers 220, 222 and 224 may have a separate MAC Service Access Point (SAP) and a MLME-PLME SAP.

According to some embodiments of the invention, each MAC entity of device 200 may be identified by a separate, e.g., unique, MAC address. For example, each MAC entity of radios 204, 206 and 208 may have a unique MAC address, e.g., with respect to the other MAC entities within device 200.

According to other embodiments of the invention, at least one MAC entity may be identified by a MAC address, which is non-unique within device 200. For example, at least a pair of MAC SAPs of radios 204, 206 and 208 may share a common MAC address, e.g., if transparent FST is to be used.

In some demonstrative embodiments, SME 202 may manage radios 204, 206 and 208 using one or more security keys.

For example, SME 202 may control the MAC SAPs of radios 204, 206 and 208 using one or more RSNA key management entities.

In some demonstrative embodiments, SME 202 may include a separate and independent key management entity to control each MAC SAP of radios 204, 206 and 208. For example, as shown in FIG. 2, SME 202 may manage radios 204, 206 and 208 using a plurality of separate and/or independent RSNA key management entities 250 252 and 254, e.g., respectively.

In some demonstrative embodiments, SME 202 may include at least one common security management key entity shard between two or more MAC SAPs of radios 204, 206 and 208. For example, SME 202 may share at least one of RSNA key management entities 250, 252 and 254 among two or more MAC SAPs of radios 204, 206 and 208, e.g., if transparent FST is used.

In some demonstrative embodiments, SME 202 may be identified by any of the MAC addresses supported by device 200, e.g., the MAC addresses supported by the MAC entities of radios 204, 206 and 208. Accordingly, SME 202 may receive notification on MLME frames received by any of the MLMEs of radios 204, 206 and 208.

In some demonstrative embodiments, multi-band management module 260 may coordinate the setup, configuration, tear down and transfer of FST sessions from a first band/channel supported by device 200 to a second band/channel supported by radios device 200.

In one example, multi-band management entity 260 may employ a combination of source and destination MAC addresses in both the first and second bands/channels to configure the routing of MSDUs and/or MLME primitives within device 200, for example, between radios 204, 206 and/or 208, e.g., if non-transparent FST is used.

In another example, multi-band management entity 260 may employ a Traffic Identifier (TID) of a FST session, e.g., in addition to the combination of the source and destination MAC addresses, to configure the routing of MSDUs and/or MLME primitives within device 200, e.g., if transparent FST is used.

Figure 3:
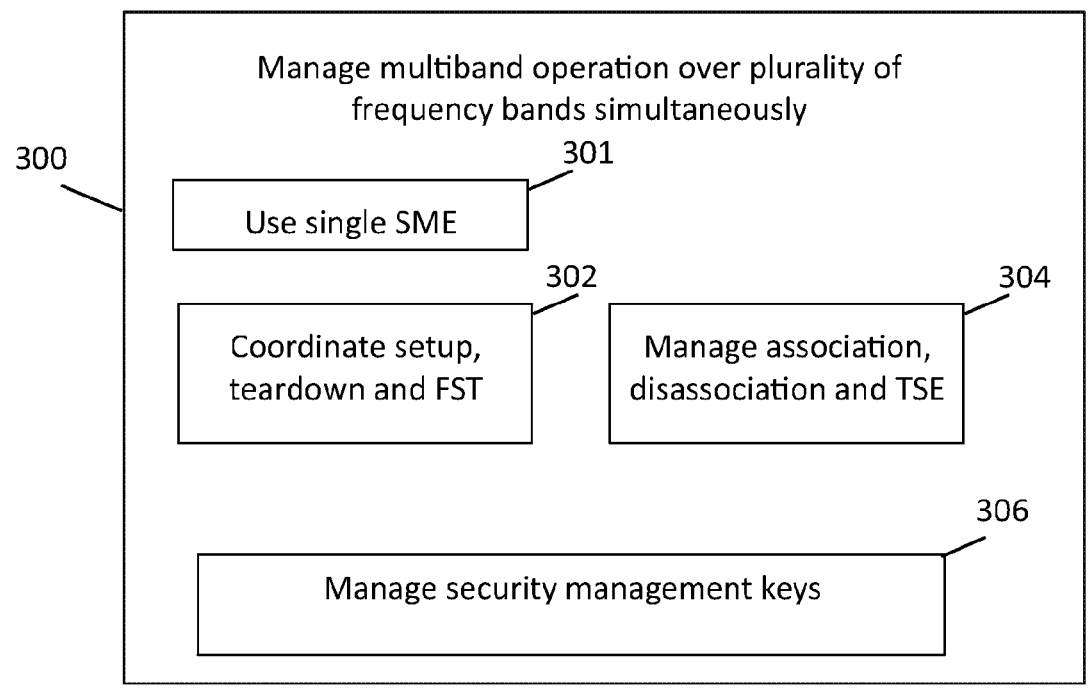
FIG. 3 is a flow chart of a method of communication over multiple wireless communication frequency bands, in accordance with some demonstrative embodiments.

Reference is made to FIG. 3, which schematically illustrates a method of communication over multiple wireless communication frequency bands, in accordance with some demonstrative embodiments. Although the scope of the present invention is not limited in this respect, one or more operations of the method of FIG. 3 may be performed by any suitable wireless communication system e.g., system 100 (FIG. 1); wireless communication device, e.g., devices 102, 130 (FIG. 1) and/or 200 (FIG. 2); and/or wireless communication unit, e.g., wireless communication units 104 and/or 132 (FIG. 1).

As indicated at block 300, the method may include managing operation of a multi-band device over at least two different frequency bands, wherein the operation across the at least two different frequency bands is done simultaneously.

As indicated at block 301, in some demonstrative embodiments, the managing may include managing at least two radios using a single SME or a single multi-band management entity for all MAC/PHY stacks.

For example, SME 202 (FIG. 2) may manage the simultaneous operation of device 200 over the frequency bands of 2.4 GHz, 5 GHz and/or 60 GHz, e.g., as described above.

As indicated at block 302, the method may include coordinating a setup, a tear down and a fast session transfer session from one frequency band to another frequency band of the multi-band station. For example, SME 202 (FIG. 2) may include coordinating a setup, a tear down and a fast session transfer session from a first frequency band of the frequency bands of 2.4 GHz, 5 GHz and 60 GHz to a second frequency band of the frequency bands of 2.4 GHz, 5 GHz and/or 60 GHz, e.g., as described above.

As indicated at block 304, the method may include commonly managing at least association, disassociation and traffic stream establishment over the at least two frequency bands. For example, module 260 (FIG. 2) may manage at least association, disassociation and traffic stream establishment over the frequency bands of 2.4 GHz, 5 GHz and/or 60 GHz, e.g., as described above.

As indicated at block 306, the method may include commonly managing one or more security management key entities corresponding to the at least two frequency bands.

In some demonstrative embodiments, each of the one or more security management key entities includes a RSNA key. For example, SME 202 (FIG. 2) may include RSNA key management entities 250, 252 and 254 (FIG. 2), e.g., as described above.

In some demonstrative embodiments, the one or more security management key entities include at least one common security management key entity corresponding to two or more of the at least two frequency bands.

Figure 4:
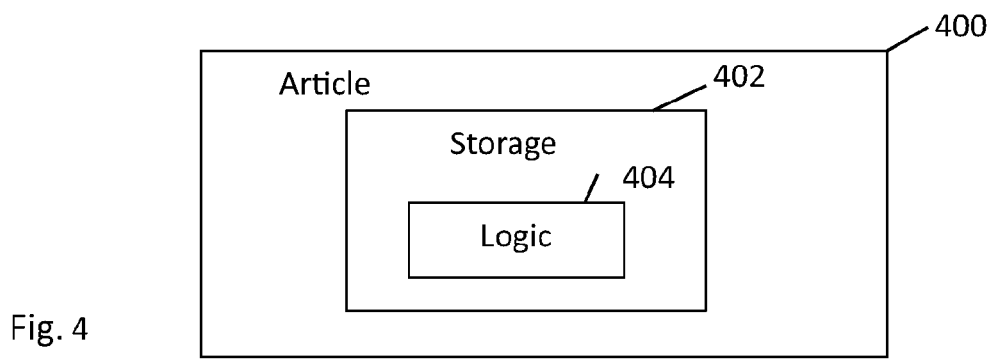
FIG. 4 is a schematic illustration of an article of manufacture, in accordance with some demonstrative embodiments.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); device 200 (FIG. 2); SME 140 (FIG. 1); SME 202 (FIG. 2); and/or to perform one or more operations of the method of FIG. 3.

Although embodiments of the present invention are not limited to this example, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A multiple frequency band (multi-band) wireless communication device comprising:
a first radio to operate at a first frequency band;
a second radio to operate at a second frequency band;
a third radio to operate at a third frequency band; and
a station management entity (SME) operably coupled to the first, second and third radios, the SME including a multiband management module to manage parallel and simultaneous operation of at least two of the first, second and third radios, said multiband management module is to employ a combination of source and destination Media Access Control (MAC) addresses in two frequency bands or channels to configure routing of MAC sub-layer management entity (MLME) primitives within the multi-band wireless communication device, if nontransparent Fast Session Transfer (FST) is used, said multiband management module to employ a Traffic Identifier (TID) of an FST session to configure the routing of the MLME primitives, if transparent FST is used.

2. The multi-band wireless communication device of claim 1, wherein said SME includes one or more security management key entities for the first, second and third radios.

3. The multi-band wireless communication device of claim 2, wherein the one or more security management key entities include at least first, second and third security management key entities for the first, second and third radios.

4. The multi-band wireless communication device of claim 2, wherein the one or more security management key entities include at least one common security management key entity shared between two or more of said first, second and third radios.

5. The multi-band wireless communication device of claim 1, wherein each of said first, second and third radios has a MAC sublayer, each MAC sublayer has a separate MAC Service Access Point (SAP), each MAC SAP is to be controlled by a separate and independent Robust Security Network Association (RSNA) key management entity, when transparent FST is not used.

6. The multi-band wireless communication device of claim 1, wherein said multiband management module is to coordinate a setup, a tear down and a transfer of the FST session from one frequency band to another frequency band of the first, second and third frequency bands.

7. The multi-band wireless communication device of claim 1, wherein said SME is to manage at least association, disassociation and traffic stream establishment for each of the first, second and third radios.

8. The multi-band wireless communication device of claim 1, wherein said first, second and third radios include at least first, second and third MAC Service Access Points (SAPs), each identified by a MAC address.

9. The multi-band wireless communication device of claim 8, wherein at least first and second MAC SAPs are identified by a same MAC address.

10. The multi-band wireless communication device of claim 1, wherein the first radio is to operate at a 2.4 Gigahertz (GHz) frequency band, the second radio is to operate at a 5 GHz frequency band and the third radio is to operate at a 60 GHz frequency band.

11. A method comprising:
managing operation of a multi-band wireless communication device over at least two different frequency bands, wherein the operation across the at least two different frequency bands is to be done simultaneously;
employing a combination of source and destination Media Access Control (MAC) addresses in both first and second frequency bands or channels to configure routing of MAC sub-layer management entity (MLME) primitives within the multi-band wireless communication device, if nontransparent Fast Session Transfer (FST) is used; and
employing a Traffic Identifier (TID) of an FST session to configure the routing of the MLME primitives, if transparent FST is used.

12. The method of claim 11 comprising:
coordinating a setup, a tear down and a transfer of the FST session from one frequency band to another frequency band of the multi-band wireless communication device.

13. The method of claim 11 comprising:
commonly managing at least association, disassociation and traffic stream establishment over the at least two frequency bands.

14. The method of claim 11 comprising:
commonly managing one or more security management key entities corresponding to the at least two frequency bands.

15. The method of claim 11, wherein said multi-band wireless communication device comprises at least two radios, each of said radios has a MAC sublayer, each MAC sublayer has a separate MAC Service Access Point (SAP), the method comprising controlling each MAC SAP by a separate and independent Robust Security Network Association (RSNA) key management entity, when transparent FST is not used.

16. The method of claim 11, wherein the one or more security management key entities include at least one common security management key entity corresponding to two or more of the at least two frequency bands.

17. The method of claim 11, wherein said at least two frequency bands comprise at least three frequency bands.

18. The method of claim 11, wherein said at least three frequency bands comprise a 2.4 Gigahertz (GHz) frequency band, a 5 GHz frequency band and a 60 GHz frequency band.

19. The method of claim 11, wherein said managing comprises managing at least two radios using a single station management entity (SME).

20. A system comprising:
at least one multiple frequency band (multi-band) wireless communication device comprising:
at least two radios to communicate over at least two different frequency bands; and
a common station management entity (SME) operably coupled to the at least two radios, and configured to manage parallel and simultaneous operation of the at least two radios, said SME is to employ a combination of source and destination Media Access Control (MAC) addresses in both first and second frequency bands or channels to configure routing of MAC sub-layer management entity (MLME) primitives within the multi-band wireless communication device, if nontransparent Fast Session Transfer (FST) is used, said SME to employ a Traffic Identifier (TID) of an FST session to configure the routing of the MLME primitives, if transparent FST is used.

21. The system of claim 20, wherein said SME includes one or more security management key entities for the at least two radios.

22. The system of claim 21, wherein the one or more security management key entities include at least two security management key entities for the at least two radios.

23. The system of claim 21, wherein the one or more security management key entities include at least one common security management key entity shared between two or more of said at least two radios.

24. The system of claim 20, wherein each of the at least two radios has a MAC sublayer, each MAC sublayer has a separate MAC Service Access Point (SAP), each MAC SAP is to be controlled by a separate and independent Robust Security Network Association (RSNA) key management entity, when transparent FST is not used.

25. The system of claim 20, wherein said SME is to coordinate a setup, a tear down and a transfer of the FST session from one frequency band to another frequency band of the at least two frequency bands.

26. The system of claim 20, wherein said SME is to manage at least association, disassociation and traffic stream establishment for each of the at least two radios.

27. The system of claim 20, wherein said at least two radios include at least first and second MAC Service Access Points (SAPs), each identified by a MAC address.

28. The system of claim 27, wherein said at least first and second MAC SAPs are identified by a same MAC address.

29. The system of claim 20, wherein said at least two radios include a first radio to operate at a 2.4 Gigahertz (GHz) frequency band, a second radio to operate at a 5 GHz frequency band, and a third radio to operate at a 60 GHz frequency band.

30. A product comprising one or more tangible computer-readable non-transitory storage media comprising computer-executable instructions operable to, when executed by at least one computer processor, enable the at least one computer processor to implement one or more operations, the operations comprising:
managing operation of a multi-band wireless communication device over at least two different frequency bands, wherein the operation across the at least two different frequency bands is to be done simultaneously;
employing a combination of source and destination Media Access Control (MAC) addresses in both first and second frequency bands or channels to configure routing of MAC sub-layer management entity (MLME) primitives within the multi-band wireless communication device, if nontransparent Fast Session Transfer (FST) is used; and employing a Traffic Identifier (TID) of an FST session to configure the routing of the MLME primitives, if transparent FST is used.

31. The product of claim 30, wherein the operations comprise coordinating a setup, a tear down and a fast session transfer of the FST session from one frequency band to another frequency band of the multi-band wireless communication device.

32. The product of claim 30, wherein the operations comprise commonly managing at least association, disassociation and traffic stream establishment over the at least two frequency bands.

33. The product of claim 30, wherein said multi-band wireless communication device comprises at least two radios, each of said radios has a MAC sublayer, each MAC sublayer has a separate MAC Service Access Point (SAP), the operations comprising controlling each MAC SAP by a separate and independent Robust Security Network Association (RSNA) key management entity, when transparent FST is not used.

* * * * *